United States Patent [19]

Johnston et al.

[11] Patent Number: 5,366,271
[45] Date of Patent: Nov. 22, 1994

[54] FOLDING INFANT RESTRAINT SEAT

[75] Inventors: G. Gilbert Johnston, Federal Way; Robert R. McAusland, Seattle, both of Wash.; William M. Dieter, Portland, Oreg.

[73] Assignee: Shanli Corporation, Federal Way, Wash.

[21] Appl. No.: 983,361

[22] Filed: Nov. 30, 1992

[51] Int. Cl.⁵ ........................ A47D 7/04; A47C 1/11; B60N 2/26
[52] U.S. Cl. .................. 297/250.1; 297/378.12
[58] Field of Search ............... 297/250.1, 255, 256, 297/256.1, 378.12

[56] References Cited

U.S. PATENT DOCUMENTS

| Re. 25,936 | 12/1965 | Throssel | 297/255 |
|---|---|---|---|
| 1,742,822 | 1/1930 | Olson | 297/255 |
| 2,500,338 | 3/1950 | Bergstein | 18/56 |
| 2,508,822 | 5/1950 | Goldberg | 297/255 |
| 2,960,149 | 11/1960 | Throssel | 297/254 |
| 2,979,121 | 4/1961 | Gates | 297/255 |
| 3,054,637 | 9/1962 | Pambello | 297/4 |
| 4,775,188 | 10/1988 | Fuchs et al. | 297/380 |
| 4,900,087 | 2/1990 | Crisp | 297/238 |
| 5,002,338 | 3/1991 | Gisser | 297/464 |
| 5,115,523 | 5/1992 | Cone | 297/256.13 |
| 5,222,641 | 6/1993 | Mederiros, Jr. | 297/255 |

*Primary Examiner*—Alexander Grosz
*Attorney, Agent, or Firm*—Christensen, O'Connor, Johnson & Kindness

[57] ABSTRACT

An infant seat (10) is disclosed for use with a vehicle seat (12) and seat belt (14) to restrain and protect an infant in the event the vehicle undergoes a sudden change in velocity. The seat (10) includes a foldable frame (16), preferably formed from a single sheet of material, and including a plurality of living hinges that flexibly join the various sections of the frame. A pair of arms (18 and 20) are included to lock the frame in an open position and include slots designed to engage the seat belt.

23 Claims, 9 Drawing Sheets

FOLDING INFANT RESTRAINT SEAT

FIELD OF THE INVENTION

This invention relates generally to infant seats and, more particularly, to seats used in vehicles to restrain infants in the event of a vehicle accident.

BACKGROUND OF THE INVENTION

Modern vehicles include many safety features. For example, vehicles are typically designed to restrain and protect adult passengers in the event the vehicle undergoes a sudden change in velocity. To that end, the vehicle includes a seat, rigidly secured to the frame of the vehicle, and, for example, a seat belt and shoulder harness that cooperatively restrain the passenger relative to the seat. Unfortunately, conventional arrangements are often ergonomically unsuited for use with infants.

A relatively wide variety of infant seats have been developed to address the limitations of conventional vehicle seats. Many such infant seats have a rigid molded body covered by a cushion or pad. The infant seat is secured to the vehicle seat by the vehicle seat belt and a separate shoulder harness assembly is used to restrain the infant in the infant seat.

Conventional infant seats of this type, however, exhibit a number of shortcomings. For example, these seats are relatively bulky and awkward to transport and store. While not a problem when the infant seat is intended for semipermanent use in a particular vehicle, these factors are undesirable if the infant seat is to be used only occasionally or in a variety of different vehicles. Another disadvantage of conventional infant seats employing rigid molded bodies is that they tend to be relatively expensive to manufacture.

As an alternative, several different types of foldable infant seats have also been developed. For example, U.S. Pat. No. 5,002,338 (Gisser) discloses a child restraint device including a support structure defined by a base, a flap, and wings, joined by various hinges that allow the device to be opened and closed. The restraint device is attached to the vehicle seat by a special strap and a harness secures the infant in the device. Like the infant seats described above, however, the Gisser restraint device appears to be relatively expensive and difficult to manufacture. Also, the Gisser device is not freestanding and requires an additional strap for attachment to the vehicle seat.

Another folding infant support device is disclosed in U.S. Pat. No. 3,054,637 (Pambello). The Pambello device includes a seat and leg supporting member and a back and head supporting member, joined by an adjustable positioning assembly that allows their relative angular orientation to be controlled. Straps are provided to restrain an infant in the device and to carry the device. Special brackets are required to attach the device to a vehicle seat. As will be appreciated, the Pambello device is not particularly compact, appears to be relatively expensive and difficult to manufacture, and, due to the bracket arrangement required, is not easily adapted for use with alternative vehicle seats.

In U.S. Pat. No. 4,900,087 (Crisp), a child seat that is built into an automobile seat is disclosed. The child seat is bolted to the automobile seat and includes hinged seat panels that fold out to support the child. Straps are employed to restrain the child in the seat. Like the Gisser and Pambello devices, the Crisp seat appears to be relatively difficult and expensive to manufacture. In addition, although the Crisp seat can be unbolted from the vehicle seat, it is inconvenient to remove the seat for use elsewhere. Further, the Crisp seat is not designed for use with conventional vehicle seats.

A number of foldable seats have also been developed that appear unsuitable for use in restraining and protecting an infant in the event a vehicle undergoes a sudden change in velocity. These seats are typically simple and inexpensive but do not appear to have the structural strength required to protect the infant. Examples of such seats are disclosed in U.S. Pat. No. 4,775,188 (Fuchs et al.) and U.S. Pat. No. 2,960,149 (Throssel).

In view of the preceding observations, it would be desirable to provide a seat that is relatively inexpensive, simple to manufacture, easily attached to a variety of different vehicle seats, readily transported and stored, freestanding, and able to adequately restrain and protect an infant in the event of a sudden change in vehicle velocity.

SUMMARY OF THE INVENTION

In accordance with this invention, a seat is provided for use with a seat belt in a vehicle to restrain an infant. The seat includes a frame that is collapsible to a folded position and extendible to an open position. An arm, movable between a first position and a second position, inhibits the frame from collapsing to the folded position when the arm is in the first position.

The frame is formed from a single sheet of flexible material that includes a back section, a base section, an upper right section, a lower right section, an upper left section, a lower left section, a back/base hinge formed between said the back section and the upper right section, an upper right/back hinge formed between the back section and the upper right section, an upper left/back hinge formed between the back section and the upper left section, a lower right/base hinge formed between the base section and the lower right section, a lower left/base hinge formed between the base section and the lower left section, a right side hinge formed in one of the upper and lower right sections, and a left side hinge formed in one of the upper and lower left sections.

In accordance with another aspect of the invention, a right arm and a left arm are employed, both of which are movable between open and folded positions. The right arm includes a body having a first end pivotably coupled to the upper right section of the frame and a second end including a hook. The left arm includes a body having a first end pivotably coupled to the upper left section of the frame and a second end including a hook. Slots provided in the bodies of the arms engage the lower sections of the frame when the arms are in their open positions. Latches, included in the hooks of the two arms, also engage recesses included in the lower sections of the frame when the arms are in their open positions.

In accordance with a further aspect of the invention, a method of manufacturing an infant seat of the type described above is provided. Also, a method of restraining an infant, using an infant seat of the type described above, is disclosed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
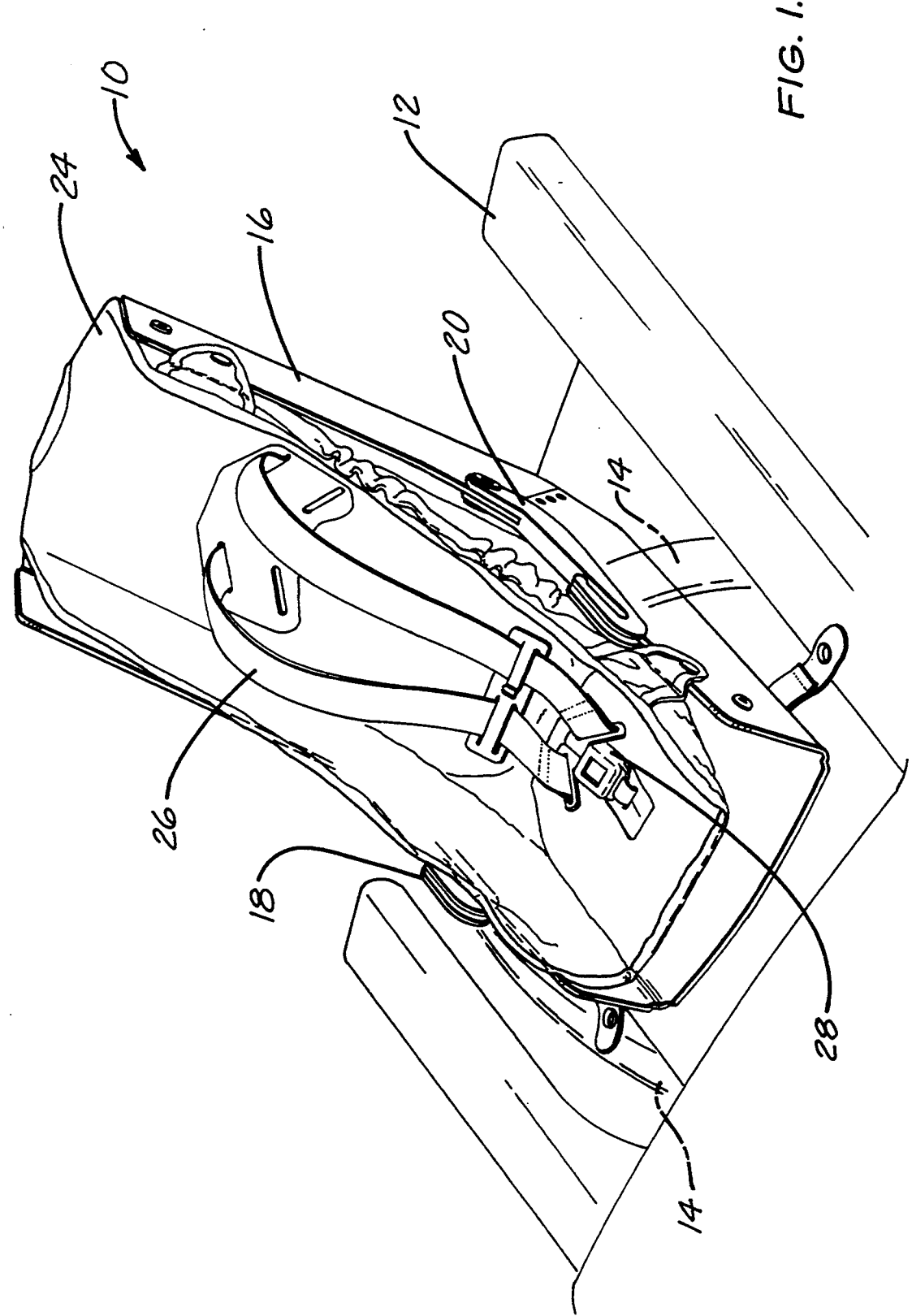
FIG. 1 illustrates a rear-facing infant restraint seat constructed in accordance with this invention, positioned on the seat of a vehicle for use in restraining an infant.

FIG. 1 illustrates an infant seat 10, constructed in accordance with this invention, for use on a seat 12 of a vehicle. The infant seat 10 faces the rear of the vehicle and is attached to the vehicle seat 12 by a seat belt 14 that is secured to the vehicle's frame. In the event the vehicle undergoes a sudden change in velocity, for example, during an accident, an infant sitting in seat 10 (but not shown) is restrained and protected from injury.

As will be discussed in greater detail below, infant seat 10 has a number of advantages over conventional seats. In that regard, it is relatively inexpensive and simple to manufacture, can be easily stored and transported, is readily used with a variety of different types of seats, and, most importantly, provides the necessary protection for the infant.

Figure 2:
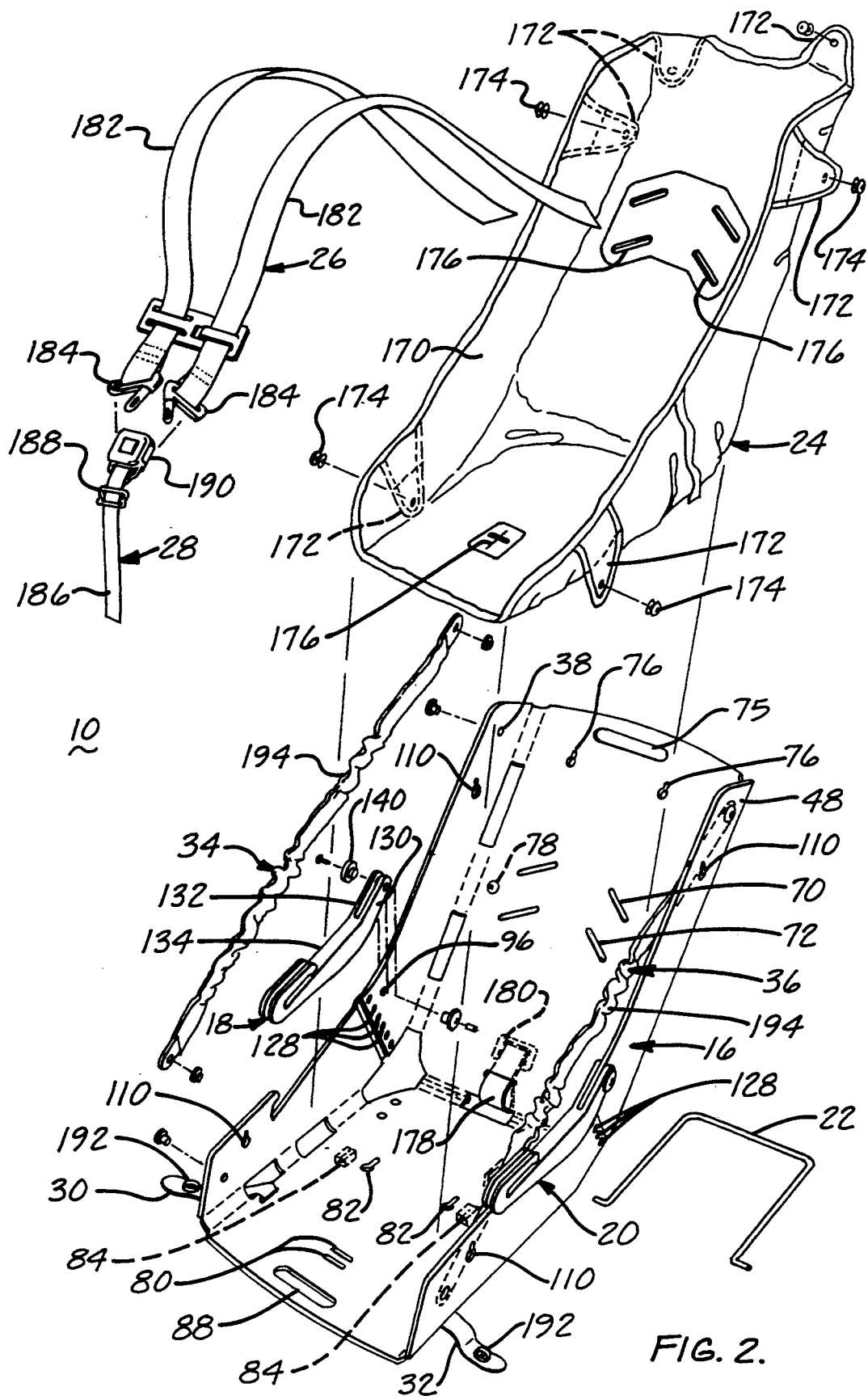
FIG. 2 is an exploded view of the seat of FIG. 1.

Referring now to FIG. 2, the infant seat 10 includes a frame 16, left and right arms 18 and 20, a stand 22, and a pad 24. The seat also includes a shoulder strap and buckle assembly 26 and a leg strap and buckle assembly 28, as well as closure straps 30 and 32 and carrying straps 34 and 36.

As will be described in greater detail below, the frame 16 allows seat 10 to be folded for storage or opened for use and is the primary component responsible for protecting an infant in the event of an accident. The left and right arms 18 and 20 are employed to lock the frame 16 in its open position, transmit loads applied to the frame, and attach seat 10 to seat belt 14. The closure straps 30 and 32 are used to lock frame 16 in its folded position. The stand 22 can be deployed to support the seat 10 in an upright position. Pad 24 provides a cushion between the infant and the relatively rigid frame 16. Finally, the shoulder strap and buckle assembly 26 and leg strap and buckle assembly 28 cooperatively restrain the infant within the seat 10, while the carrying straps 34 and 36 allow seat 10 to be easily carried when it is opened.

Figure 3:
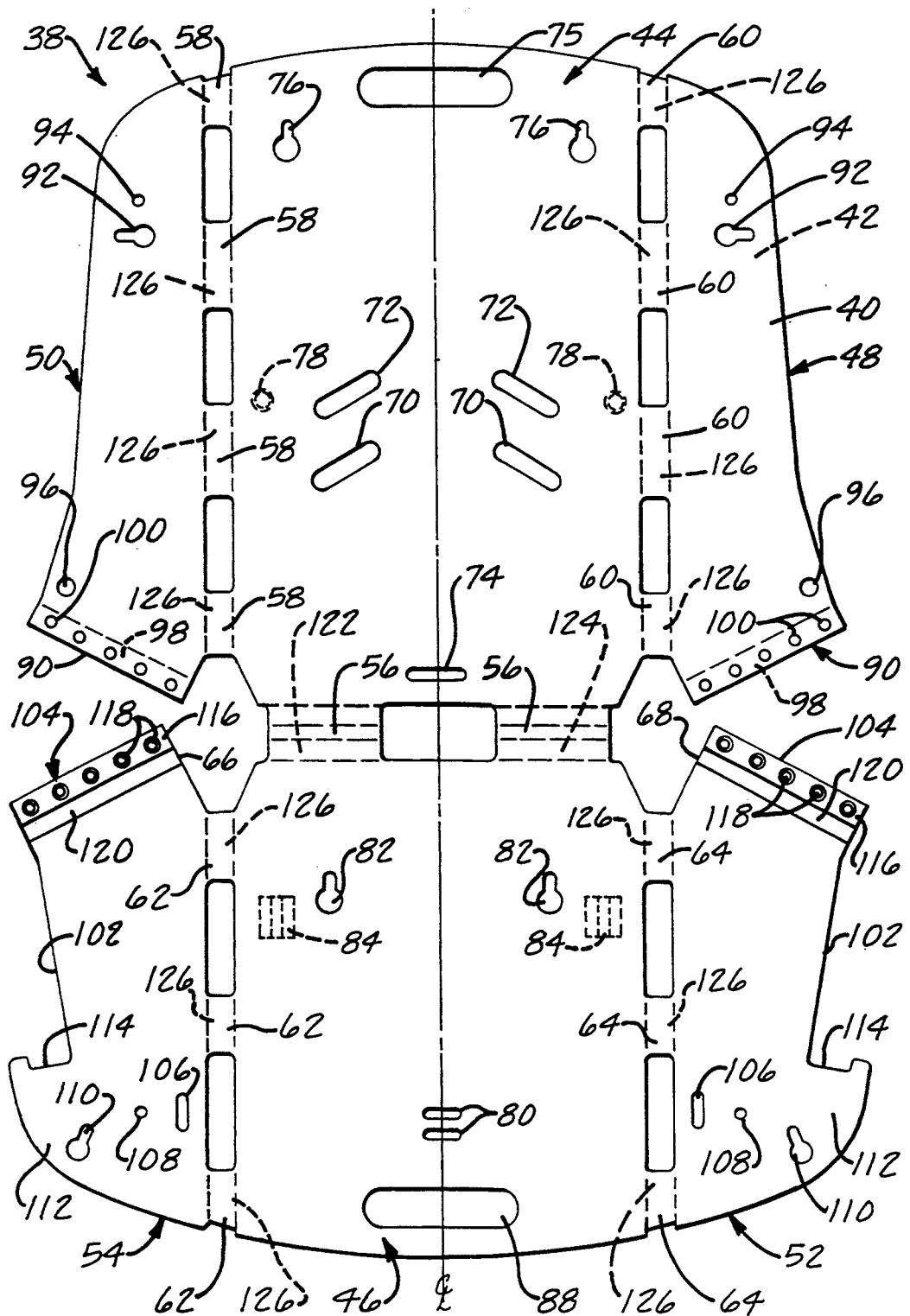
FIG. 3 illustrates a frame, included in the seat of FIG. 1, in an unfolded and unassembled position.

Addressing these various components of seat 10 in greater detail, the frame 16 is preferably formed from a single sheet 38 of material, shown in FIG. 3. More particularly, in the preferred arrangement, the sheet 38 is made of polyethylene, polypropylene, or some other semirigid plastic material selected to flex under the expected loads without permanent deformation. The sheet 38 is on the order of 0.6 cm thick, 81 cm long, and 30 cm wide. The sheet 38 has the rigidity needed to support an infant, the flexibility required to provide suitable hinges (as described in greater detail below), and the resiliency needed to absorb stresses applied to the frame in the event the vehicle undergoes a sudden change in velocity. Depending upon the thickness of the material used for sheet 38, the edges of the sheet may be rolled to increase their effective radius for infant safety.

The sheet 38 has a front surface 40 and back surface 42 and is generally divided into six regions: a back 44, base 46, upper right side 48, upper left side 50, lower right side 52, and lower left side 54. The sheet 38 also includes back/base hinges 56, left/back hinges 58, right/back hinges 60, left/base hinges 62, right/base hinges 64, a left side hinge 66, and a right side hinge 68.

Reviewing the different regions of sheet 38 individually, the back 44 is responsible for supporting the upper body of the infant. Back 44 is roughly rectangular in shape and is symmetric about a frame center line.

The back 44 includes two pairs of slotted shoulder strap openings 70 and 72 extending through the sheet. The first pair of openings 70 are positioned roughly halfway between the upper and lower edges of back 44, with one opening provided on each side of the center line at a slight inclination. The second pair of openings 72 are aligned with, and spaced slightly above, openings 70. As will be described in greater detail below, the openings 70 and 72 are dimensioned and used to attach the shoulder strap and buckle assembly 26 to frame 16, with the two sets of openings providing some adjustability in the system.

The back 44 also includes a slotted base opening 74, extending parallel to the lower edge of the back and centered about the center line. The opening 74 allows the shoulder strap and buckle assembly 26 to be attached to frame 16. Another larger slotted opening 75 is provided adjacent the upper edge of the back 44 and centered about the center line. This opening 75 forms a handle that can be used to carry the seat 10 when it is empty.

A pair of pad eyes 76 are located on opposite sides of opening 75, adjacent the upper edge of back 44. Each eye 76 includes a generally circular opening that extends into a slotted opening, having a smaller width, directed toward the upper edge of back 44. As will be described in greater detail below, the slotted pad eyes 76 are designed to engage buttons provided on the pad 24, allowing the pad 24 to be easily attached to, and removed from, the back 44 of frame 16.

Finally, a pair of male snaps 78 project from the back surface 42 of frame 16. One snap 78 is positioned adjacent each side of back 44, at a point roughly midway between the upper and lower edge of back 44. The male snaps 78 are designed for use with closure straps 30 and 32 to secure frame 16 in its folded position, as will be described in greater detail below.

The base 46 of frame 16 is also roughly rectangular in shape and is symmetric about the frame center line. Base 46 includes one pair of slotted leg strap openings 80, which extend perpendicular to, and are bisected by, the frame center line. The openings 80 are spaced apart from the forward edge of base 46 and are dimensioned and used to attach the leg strap and buckle assembly 28 to the frame 16.

The base 46 also includes a second pair of pad eyes 82, constructed in the same manner as eyes 76. Pad eyes 82 are provided on opposite sides of the frame center line, adjacent the rear edge and sides of base 46, with their slotted openings extending toward the rear edge. The pad eyes 82 are used to attach the pad 24 to the base 46.

A pair of stand mounting pads 84 project from the back surface 42 of base 46, on opposite sides of the frame center line at points between openings 80 and pad eyes 82. As will be described in greater detail below, pads 84 include passages extending parallel to the center line of frame 16 through which the stand 22 is allowed to translate from a stowed position to a deployed position extending beyond base 46 and supporting the seat 10 in an upright manner.

The base 46 also includes a slotted opening 88, similar to opening 75, positioned adjacent the forward edge of base 46 and bisected by the frame center line. As will be appreciated, opening 88 provides a handle that can be used to carry the seat 10 when it is not in use.

Discussing now the upper right side 48 and upper left side 50 of frame 16, these sections of the frame are generally mirror images of each other. As shown in FIG. 3, each side 48 and 50 generally increases in width from its upper end to its lower end, which defines a hinge edge 90. Like the other sections of frame 16, sides 48 and 50 have generally rounded contours for the safety of the infant using seat 10.

The upper sides 48 and 50 each include a carrying strap eye 94, positioned near the upper end. The circular eyes 94 allow the carrying straps 34 and 36 to be riveted to frame 16. The upper sides 48 and 50 also include arm pivot eyes 96, adjacent the outer corners of hinge edges 90, for use in pivotably coupling arms 18 and 20 to the frame 16.

Each hinge edge 90 includes a recess 98, formed in the back surface 42 of sheet 38 to a depth that is one-half the thickness of sheet 38. Recesses 98 extend the length of hinge edges 90 and mate with recesses provided in the lower sides 52 and 54 to join the upper and lower sides. As will be described in greater detail below, a plurality of equally spaced rivet eyes 100 are provided in the hinge edge 90 to allow the sides to be riveted together. Alternatively, eyes 100 may be omitted if the sides of the frame are, for example, welded together ultrasonically.

Reviewing now the lower right side 52 and lower left side 54 of frame 16, each side 52 and 54 includes an outer edge 102 and a hinge edge 104. As shown in FIG. 3, a slotted opening 106, corresponding to opening 92, is provided adjacent the inner edge of the side near the front of the side, for use in attaching closure straps 30 and 32. A carrying strap eye 108 is positioned adjacent each opening 106 to allow the carrying straps 34 and 36 to be riveted to sides 52 and 54.

Each side 52 and 54 also includes a slotted pad eyes 110 positioned between eye 108 and outer edge 102. The pad eyes 110 are included to allow pad 24 to be attached to sides 52 and 54. To that end, pad eyes 110 are dimensioned in the same manner as eyes 76 and 82 and their slotted openings extend generally toward the inner edge and hinge edge of sides 52 and 54.

The outer edges 102 of sides 52 and 54 are provided with a substantially hook-shaped section 112 and recess 114 that are positively engaged by the locking arms 18 and 20, as will be described in greater detail below. As shown in FIG. 3, sections 112 extend roughly parallel to the junctions between sides 52 and 54 and the base 46, while recesses 114 are generally perpendicular to those junctions.

The hinge edge 104 of each side 52 and 54 includes a recess 116 formed in the front surface 40 of sheet 38 along the entire length of edge 104. As will be described in greater detail below, the recessed hinge edges 104 of the lower sides 52 and 54 are dimensioned to mate with the recessed hinge edges 98 of the upper sides 48 and 50 to form a continuous and substantially uniform joint between the upper and lower sides. To that end, six equally spaced-apart rivet eyes 118 are provided in the recessed hinge edges 104 to allow the sides to be riveted together. As noted above, the rivet eyes can be omitted if the sides are to be ultrasonically welded.

A second recess 120 is also provided in the front surface 40 of sheet 38 on lower sides 52 and 54. Recesses 120 are parallel to, and immediately adjacent, the inner edge of recesses 116 and are roughly 1.3 cm wide and 0.5 cm deep. As will be described in greater detail below, with the upper and lower sides joined, these recesses 120 effectively define the side hinges 66 and 68, which are roughly 0.1 cm thick.

Discussing now the various hinges formed in sheet 38, two back/base hinges 56 are formed into sheet 38 on opposite sides of the frame center line, adjacent the beveled corners of the back 44 and base 46. The hinges 56 are preferably 3.8 cm wide, 7.6 cm long, and separated by a distance of roughly 7.6 cm. Each hinge 56 includes two recesses 122 and 124 provided in the back surface 42 and extending generally parallel to the joined edges of the back 44 and base 46. Recesses 122 and 124 are roughly 1.3 cm wide, 0.5 cm deep, and are separated by a rib that is roughly 1.3 cm wide. As will be described in greater detail below, because the recesses 122 and 124 are thinner than the back 44 and base 46, the hinges 56 can be flexed relatively easily, providing a monolithic, integral, "living" joint between the back 44 and base 46.

Figure 6:
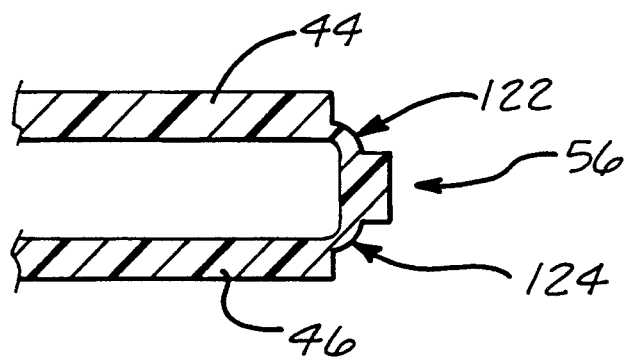

One of the hinges 56 is shown in cross section in FIG. 6. By providing two spaced-apart recesses 122 and 124 in each hinge 56, rather than a single recess, the hinge 56 flexes about a radius that is determined in part by the width of the intervening rib. As a result, some separation can be maintained between the back 44 and base 46 when the seat is folded to accommodate, for example, padding and buckles. Further, the stress applied to each recess during opening and closing of the seat is reduced, extending the life of hinges 56. Also, by employing two narrower hinges, rather than a single wider hinge, a more flexible joint between the back 44 and base 46 is provided. By appropriately selecting the material used for sheet 38, and the relative number, width, length, depth, and separation of the recesses, as well as the number and arrangement of the hinges, considerable control over the flexibility of the back/base joint can be achieved.

As shown in FIG. 3, four left/back hinges 58 and four right/back hinges 60 are employed to flexibly connect the upper left side 50 and upper right side 48 to the back 44. Hinges 58 and 60 are each roughly 1.9 cm wide and 6 cm long and are separated by a distance of 6.3 cm. Each hinge is defined by a single recess 126 provided in the back surface 42 of the frame 16. The recess 126 is of the same dimensions as the hinge 58 or 60 and is roughly 0.5 cm deep, leaving a region of material roughly 0.1 cm thick.

Figure 5:
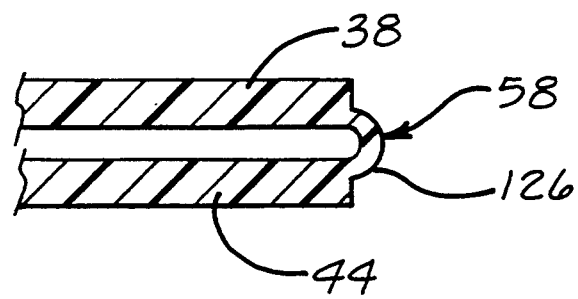
FIGS. 5 and 6 are cross-sectional views of hinges formed in the seat of FIG. 1.

As shown in the cross-sectional view of FIG. 5, hinges 58 and 60 are dimensioned to provide a relatively large radius bend when the seat is folded. Thus, the deformation and yield of the hinge which might occur with a smaller radius is avoided and room is provided for padding. By employing four shorter hinges, rather than a single hinge extending the entire length of the back 44, a more flexible joint is provided between the upper sides and the back.

The left/base hinges 62 and right/base hinges 64 similarly join the lower right side 52 and lower left side 54 to the base 46. Three such hinges 62 and 64 are provided on each side and have the same general dimensions and construction as hinges 58 and 60. As with the other hinges, by appropriately selecting relative dimensions and orientation of the recesses and hinges, the flexibility of the joint can be readily controlled.

The left and right side hinges 66 and 68 are actually formed in the lower and right sides 52 and 54 of the frame. In that regard, as noted above, recesses 120 define these hinges. By appropriately selecting the relative dimensions and orientation of recesses 120, the flexibility of hinges 66 and 68 can be controlled.

A sheet 38 having the foregoing construction can be produced in a variety of different manners. For example, the sheet 38 can be machined from a generally rectangular sheet of material. This approach is relatively easy and simple and does not require a large capital equipment expense. Alternatively, the sheet 38 could be molded, for example, with an injection mold. Although this approach requires a greater initial capital expense and greater control during manufacturing than machining, it is preferable for high volume production. The overall cost of molding is also limited by the design's susceptibility to use of relatively shallow molds.

Once the desired sheet 38 has been produced, only one additional step is required to form the frame 16. In that regard, in FIG. 2, the recessed hinge edges 90 and 104 of upper left side 48 and lower left side 52 are joined by rivets 128. Similarly, the recessed hinge edges 90 and 104 of upper left side 50 and lower left side 54 are joined by rivets 128. Alternatively, the sides can be ultrasonically welded or cemented together. With the sides joined, the frame 16 no longer assumes a planar configuration and, instead, is movable between an open position and a closed, or folded, position.

Although the foregoing description discusses the currently preferred embodiment of frame 16, other frame constructions can be employed as desired. For example, the thickness of the frame material can be altered to control the relative flexibility of different sections of the frame 16. To that end, the expected flexure of the portion of the back 44 supporting an infant's spine can be reduced by increasing the thickness of the back 44 along the center line of the frame. Similarly, rather than employing a sheet of substantially solid material, the frame could include regions with additional openings or the surface could be constructed with ribs to reduce the weight of frame 16, while retaining the desired overall strength and resiliency of seat 10.

Figure 4:
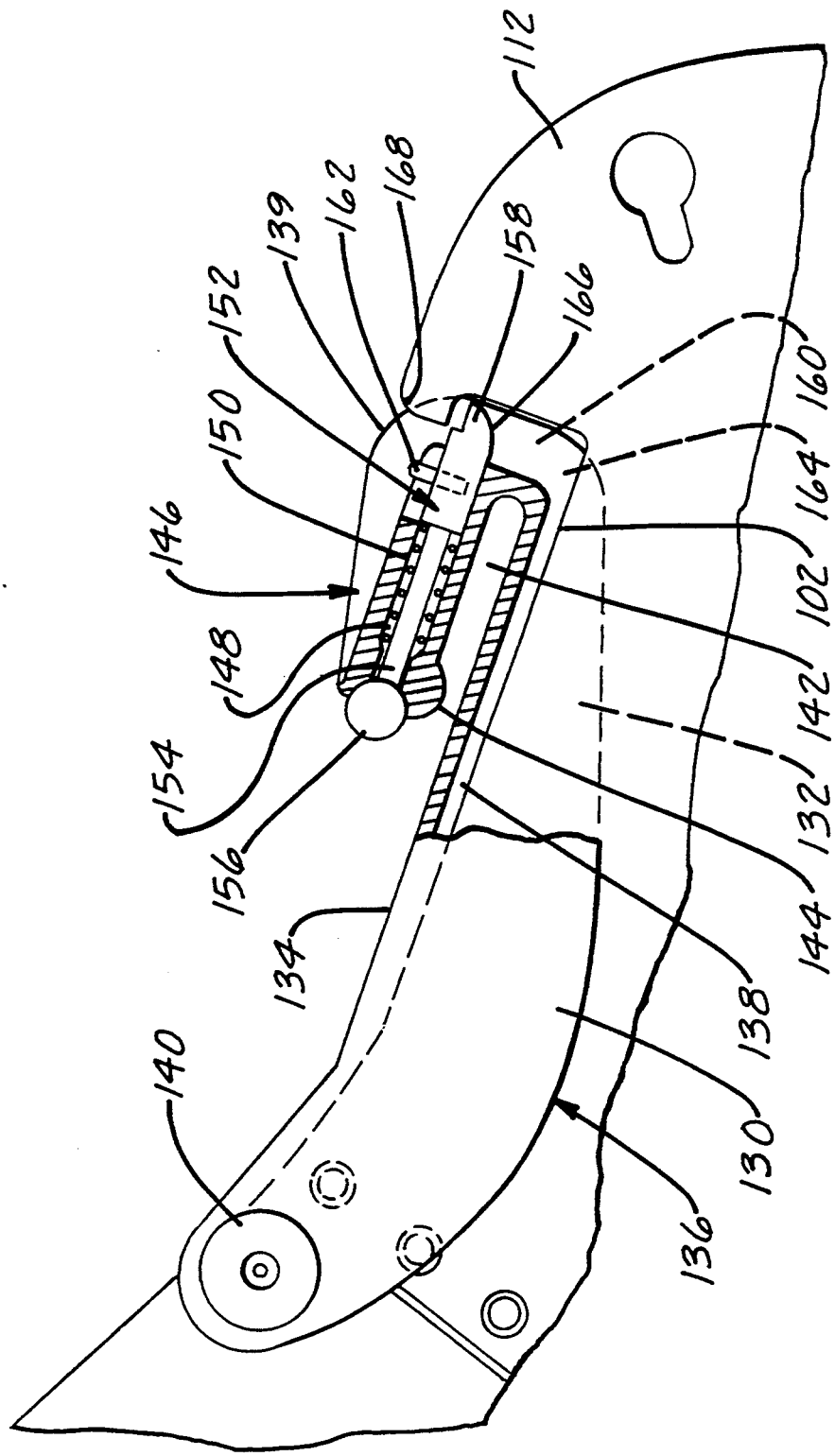
FIG. 4 is a partial sectional view of a locking arm included in the seat of FIG. 1 illustrating the way in which the arm engages the frame.

Addressing now the construction of the right and left arms 18 and 20, as shown in FIGS. 2 and 4, each arm includes an inside plate 130, an outside plate 132, and a joining central rib 134. Together, these components cooperatively define a body 136 and hook 139.

Figures 7, 8:
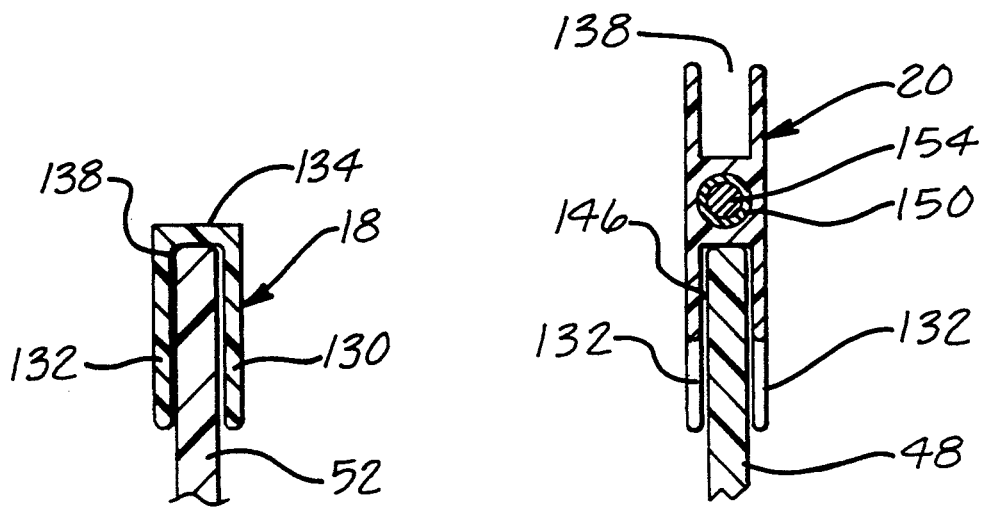
FIG. 7 is a cross-sectional view illustrating the locking arm of FIG. 4 in a lowered position in which a portion of the frame is received in a lower arm channel.
FIG. 8 is a cross-sectional view illustrating the locking arm of FIG. 4 in a raised position in which a portion of the frame is received in an upper arm channel.

The body 136 is an elongate structure, including an open channel 138 defined by the plates 130 and 132 and the central rib 134. The lower channel 138 is substantially U-shaped in cross section and is designed to receive a portion of the outer edge 102 of lower side 52 or 54, as shown in FIG. 7, when the arm is pivoted to its lowered position. A pivot pin 140 pivotably couples one end of the arm body 136 to the eye 96 formed in the upper side 48 or 50 of frame 16.

At the opposite end of the body 136, the arm is folded over upon itself to define the hook 139. The separation of the body 136 and hook 139 is substantially uniform along the entire length of hook 138 and defines a seat belt slot 142 dimensioned to receive vehicle seat belt 14. A rounded detent 144 is, however, provided at the end of hook 139 to retain the seat belt in slot 142.

The portion of plates 130 and 132 and central rib 134 defining hook 2139 form an upper channel 146 that is open in a direction opposite that of open channel 138. Channel 146 is also substantially U-shaped in cross section and is designed to receive a portion of the outer edge of upper side 48 or 50, as shown in FIG. 8, when the arm is rotated to a raised position.

The portion of the central rib 134 included in hook 139 is relatively thick and includes an axially extending aperture 148 dimensioned to receive a bias spring 150 and a latch pin 152. The latch pin 152 includes a shaft 154, including a knob 156 at one end and a detent 158 at the other end. The spring 150 normally biases the latch pin 152 to a position in which the detent 158 projects from aperture 148 into the junction 160 of the lower and upper channels 138 and 146. A pin 162, extending into a slot 164 provided in pin 152, prevents the latch pin 152 from rotating. The knob 156 allows the latch pin 152 to be manually drawn into aperture 148, against the bias spring 150.

As noted above, when arms 18 and 20 are in their lowered positions, shown in FIG. 1, the outer edges of the lower right and lower left sides 52 and 54 are received within the lower channels 138 defined in the two arms. In addition, the upper right and left sides 48 and 50 are secured to arms 18 and 20 by pins 140. As a result, lateral flexure of the upper and lower left sides relative to each other is limited, as is lateral flexure of the upper and lower right sides. The arms 18 and 20 also transmit loads that would otherwise be applied to the left and right side hinges 66 and 68 during sudden deceleration of the vehicle to sides 48 and 50 via pins 140 to hole 96.

During the rotation of arms 18 and 20 to their open positions, a rounded surface 166 on the detent 158 of each latch pin 152 contacts a corresponding rounded surface 168 on the hook-shaped section 112, as shown in FIG. 4. Continued rotation of arms 18 and 20 forces latch pins 152 into apertures 148, against the bias springs 150, with the rounded surfaces 166 and 168 ensuring that this action occurs smoothly. As arms 18 and 20 reach their fully open positions, the pins 152 clear the hook-shaped sections 112, and the bias springs 150 force pins 152 into the recesses 114 provided in the lower left and lower right sections of frame 16.

With the latch pins 152 securely engaging recesses 114, the arms 18 and 20 are locked in their closed positions. Thus, the arms 18 and 20 and seat 10 will not be accidentally folded by, for example, an infant sitting in the seat or the forces applied to the seat during a sudden change in vehicle velocity.

To fold or close the frame 16, the knob 156 provided on each latch pin 152 is pulled, drawing the latch pin 152 into aperture 148, against the bias spring 150. As a result, the latch pins 152 are withdrawn from recesses 114, allowing the latch pin detents 158 to clear the hook sections 112 on frame 16. The arms 18 and 20 are then rotated to their fully closed positions (shown in FIG. 11), in which portions of the outer edges of the upper left and right sides 48 and 50 are received within the closed channels 146 of the two arms. In this position, the left and right side hinges 66 and 68 are free to flex.

As with frame 16, the arms 18 and 20 may have any of a variety of alternative constructions. For example, the open and closed channels in the arms may be constructed to provide a snap fit with the frame to further retain the arms in their open and closed positions. Similarly, the arms may be provided with latches designed to engage recesses provided on the front or back surfaces 40 and 42, rather than edge, of frame 16. If the lower sections of the frame are provided with slots that align with the seat belt slots 142 when arms 18 and 20 are in their open positions, the latching mechanism could be deleted altogether, relying instead upon a seat belt threaded through the aligned slots to restrict rotation of the arms. In yet another variation, the arms may be pivotably coupled to the lower sections of the frame, rather than the upper sections, if desired.

Turning now to the next component of seat 10, the stand 22 may have any of a variety of different constructions. In the preferred embodiment, shown in FIG. 2, the stand 22 is a piece of roughly U-shaped 6 millimeter wire or metal. In an alternative arrangement (not shown), stand 22 may be a flat sheet of the same material used in the construction of frame 16.

The stand 22 is coupled to the base 46 of frame 16 by the stand mounting pads 84 for movement between a closed position, in which it does not project beyond the perimeter of base 46, and an open position, in which it does project substantially beyond the perimeter of base 46 to support seat 10 in an upright position. In that regard, the ends of the U-shaped stand 22 pass through openings in the stand mounting pads 84 and are designed for translation in a plane parallel to base Alternatively, the stand 22 may be attached for rotation between open and closed positions.

As noted above, the seat 10 also includes a pad 24 used in conjunction with frame 16. Pad 24 includes a soft cloth body 170 contoured to fit inside frame 16. The pad 24 enhances the comfort of the seat 10 and further protects the infant in the event the vehicle undergoes a sudden change in velocity.

The pad 24 includes a plurality of cloth arms or tabs 172. These tabs 172 are removably attached to frame 16 by plastic buttons 174 having two heads provided at opposite ends of a common shaft. The tabs 172 and buttons 174 are positioned to allow the buttons 174 to cooperatively engage the various slotted pad eyes 76, 82, and 110 included in the frame 16. Each button 174 is attached to the corresponding eye by inserting one head through the circular portion of the pad eye and then drawing the shaft of the button into the slotted portion of the eye. The slotted portions of the various pad eyes are oriented so that the elasticity of the pad 24 naturally biases the button shafts into the slotted portions of the pad eyes, retaining the pad 24 in place, while allowing it to be easily removed. In an alternative embodiment, the tabs 172 may be omitted and the buttons 174 used to couple the pad directly to the frame.

The pad 24 also includes a plurality of slotted openings 176 passing therethrough. More particularly, two pairs of slotted openings 176 are included to allow straps employed in the shoulder strap and buckle assembly 26 to pass through the pad 24. Similarly, another slotted opening 176 is included to allow the leg strap and buckle assembly 28 to pass through pad 24.

Discussing now the shoulder strap and buckle assembly 26, assembly 26 includes a back strap 178. Back strap 178 is located behind the seat back 44 and is attached to the lower portion of back 44 by looping it through slot 74 and the opening between the two back/base hinges 56. The back strap 178 is then secured using a buckle 180.

Two shoulder straps 182 are also coupled to buckle 180, behind back 44, and are then threaded through the appropriate pair of slots 70 or 72 in frame 16, as well as the appropriate slots 176 in pad 24. The shoulder straps 182 terminate in separate male buckle elements 184, which are releasably engaged by the leg strap and buckle assembly 28 as described in greater detail below.

The leg strap and buckle assembly 28 is attached to the base 46 of frame 16 by a single strap 186 threaded through the slotted openings 80 in the frame and the matching slots 176 in pad 24. The looped strap 186 is secured to frame 16 by a buckle 188. A female buckle element 190, designed to allow the two male buckle elements 184 of assembly 26 to be individually engaged and released, is attached to the strap 186.

The closure straps 30 and 32 are threaded through slotted openings 106 in the lower left and right sections and openings between the left and right base/side hinges 62 and 64. The straps 30 and 32 terminate in female closure snaps 192 designed to engage the male closure snap 78 provided on the back 44 of frame 16, when the seat 10 is folded to its closed position.

The carrying straps 34 and 36 are designed to stretch a predetermined distance before resisting further elongation. Each strap includes an elastic core (not shown) enclosed by a protective sheath 194. The ends of the straps 34 and 36 are affixed to the eyes 94 and 108 in the upper and lower sides 48, 50, 52, and 54. Thus, straps 34 and 36 link the upper and lower sections of the frame 16 and allow the seat 10 to be easily carried when in its open position and supporting an infant. In an alternative embodiment, elastic webbing is used in place of the cores and sheaths.

Figure 9:
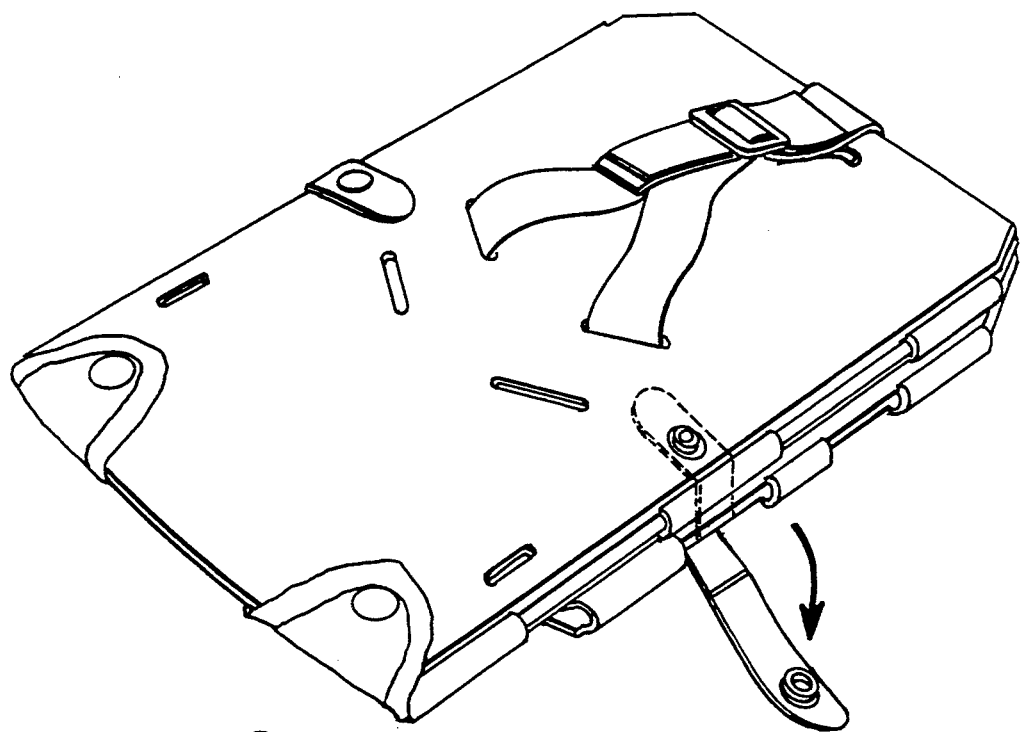
FIG. 9 illustrates the seat of FIG. 1 in a fully closed position.

Having reviewed the basic construction of seat 10, its use will now be considered in greater detail. In that regard, assume first that seat 10 is in the fully closed or folded position shown in FIG. 9. In that position, arms 18 and 20 are in their raised positions against the upper left and upper right sides 50 and 48, respectively. These sides are folded against the back 44 and the lower left and lower right sides 54 and 52 are folded against the base 46. The back 44 and base 46 are, in turn, folded together and the female snap closures 192 on closure straps 30 and 32 engage the male closure snap 78 provided on back 44, securing the seat 10 in its folded position.

Figure 10:
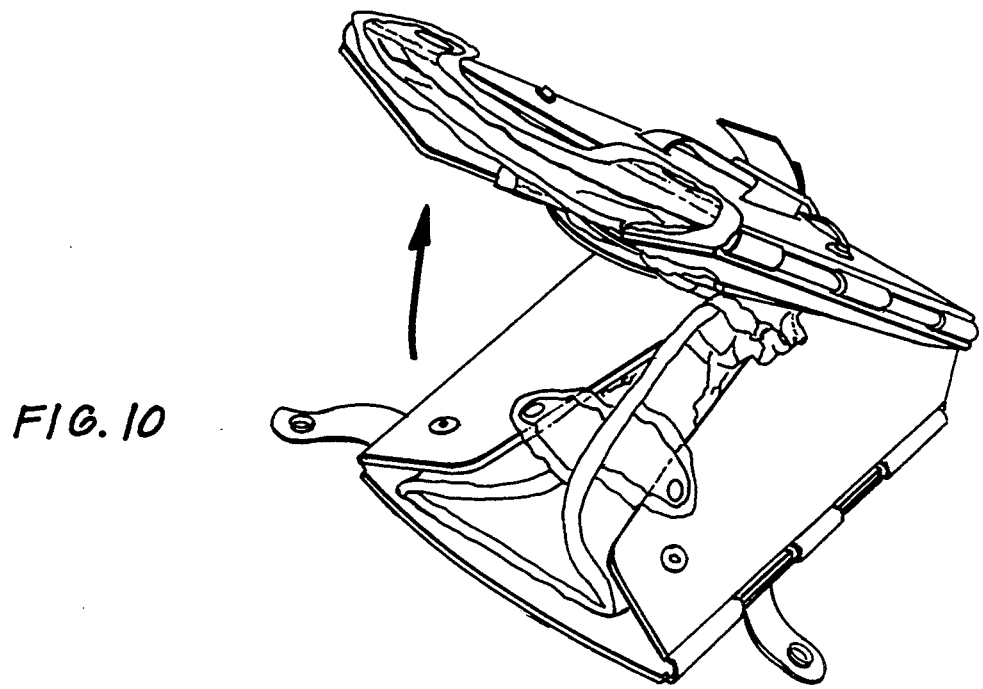
FIGS. 10 and 11 illustrate the seat of FIG. 1 in partially open positions.
Figures 11, 12:
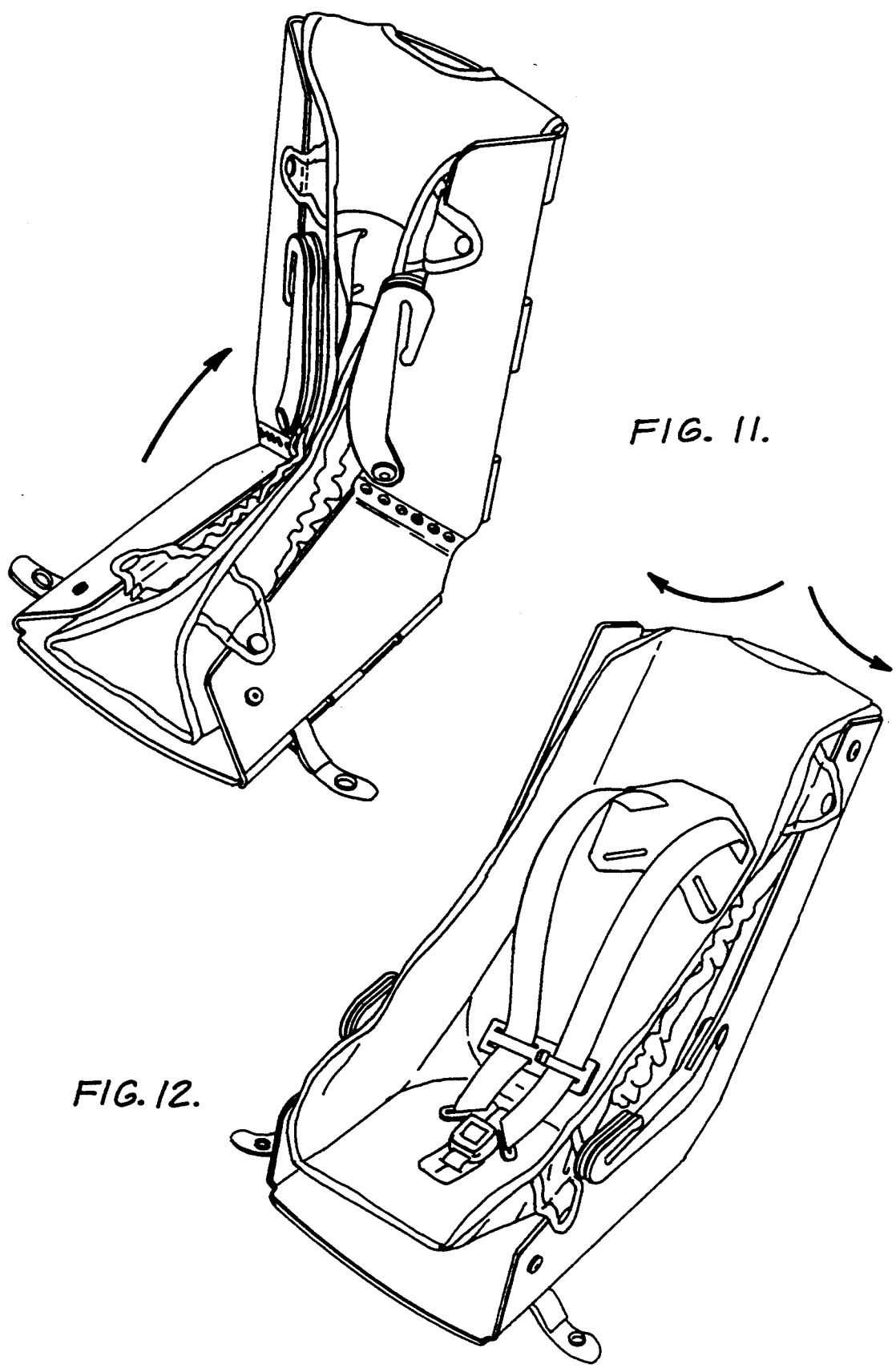
FIG. 12 illustrates the seat of FIG. 1 in a fully open position.

To unfold seat 10 in the manner sequentially illustrated in FIGS. 10, 11, and 12, the closure snaps 192 are first released. Given the nature of the living hinges employed in the frame 16, the hinges impart a natural bias to the frame 16, causing the back 44 and base 46 to spread apart and the sides to slightly unfold. As a result, the seat 10 naturally moves to a partially open or folded position, which may resemble the position shown in FIG. 10. From this point, it is necessary for the user to manually spread the back and base and left and right sides apart, until the sides are roughly perpendicular to the back 44 and base 46, as shown in FIGS. 11 and 12.

With the frame positioned as shown in FIG. 12, the left and right arms 18 and 20 are then rotated to their lowered positions. As a result, the outer edges of the lower right side 52 and lower lea side 54 are received within the appropriate open channels 138 of the arms. Also, as noted previously, as each arm is rotated, the latch pin 152 is forced against the bias spring 150 until it clears the hook-shape section 112 and the detent 158 engages the recess 114 provided in the lower section of the frame. The bias spring 150 then maintains the desired engagement of the latch pin 152 and recess 114, preventing further rotation of the arm. With arms 18 and 20 in their lowered positions, lateral flexure of the sides is restricted, certain loads applied to the frame are absorbed, and the seat 10 is rigidly secured in its open position.

Once the seat 10 has been opened, the stand 22 is extended and the seat 10 placed on the vehicle seat 12, facing backwards. The infant is then placed in seat 10 and the male buckle elements 184 of the shoulder strap and buckle assembly 26 are latched into the female buckle element 190 of the leg strap and buckle assembly 28, restraining the infant in seat 10. Finally, the vehicle seat belt 14 is slipped into the seat belt slots 142 provided in arms 18 and 20.

An infant seat 10 constructed in accordance with this invention and used in the manner described above is well able to restrain an infant in the event of, for example, an airline crash. In that regard, the infant is restrained relative to seat 10 by assemblies 26 and 28. The load applied to the seat 10 as the infant decelerates is transferred in substantial part to the back 46. Also, a significant load is transmitted by arms 18 and 20, rather than being absorbed by hinges 66 and 68.

Figure 13:
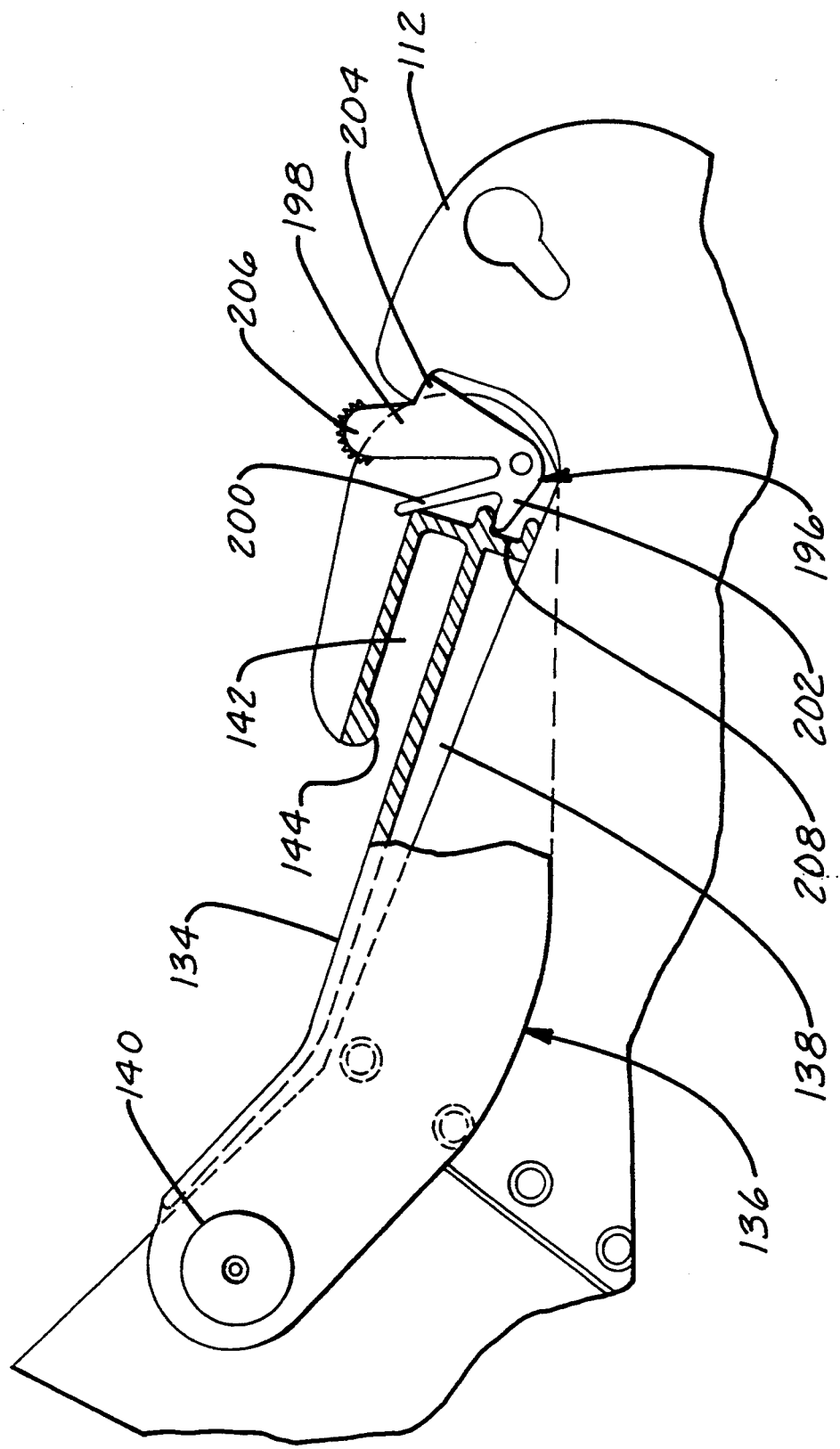
FIG. 13 illustrates an alternative embodiment of the locking arm of FIG. 4.

Turning now to several final embodiments of the invention, FIG. 13 illustrates one alternative configuration of arms 18 and 20. Generally, the construction is the same as that shown in FIG. 4, with the exception that the bias spring 150 and latch pin 152 are replaced by a three-finger latch 196, which is pinned or molded into the arm. As shown, latch 196 includes a latch finger 198, spring finger 200, and stop finger 202.

The latch finger 198 includes detent 204 that is biased into contact with the recess 114 when the arm is in the lowered position. This biasing is achieved by the spring finger 200, which abuts the central rib 134 of the arm adjacent the closed channel 146 and forces detent 204 into recess 114. To release the detent 204, a release extension 206 on the latch finger 198 is pushed or pulled toward the spring finger 200, causing the spring finger 200 to flex. Eventually, the detent 204 clears the hook section 112 and the arm unlatches. The stop finger 202 cooperates with a channel 208 defined in the central rib to limit the rotation of the latch 196 in either direction.

Figure 14:
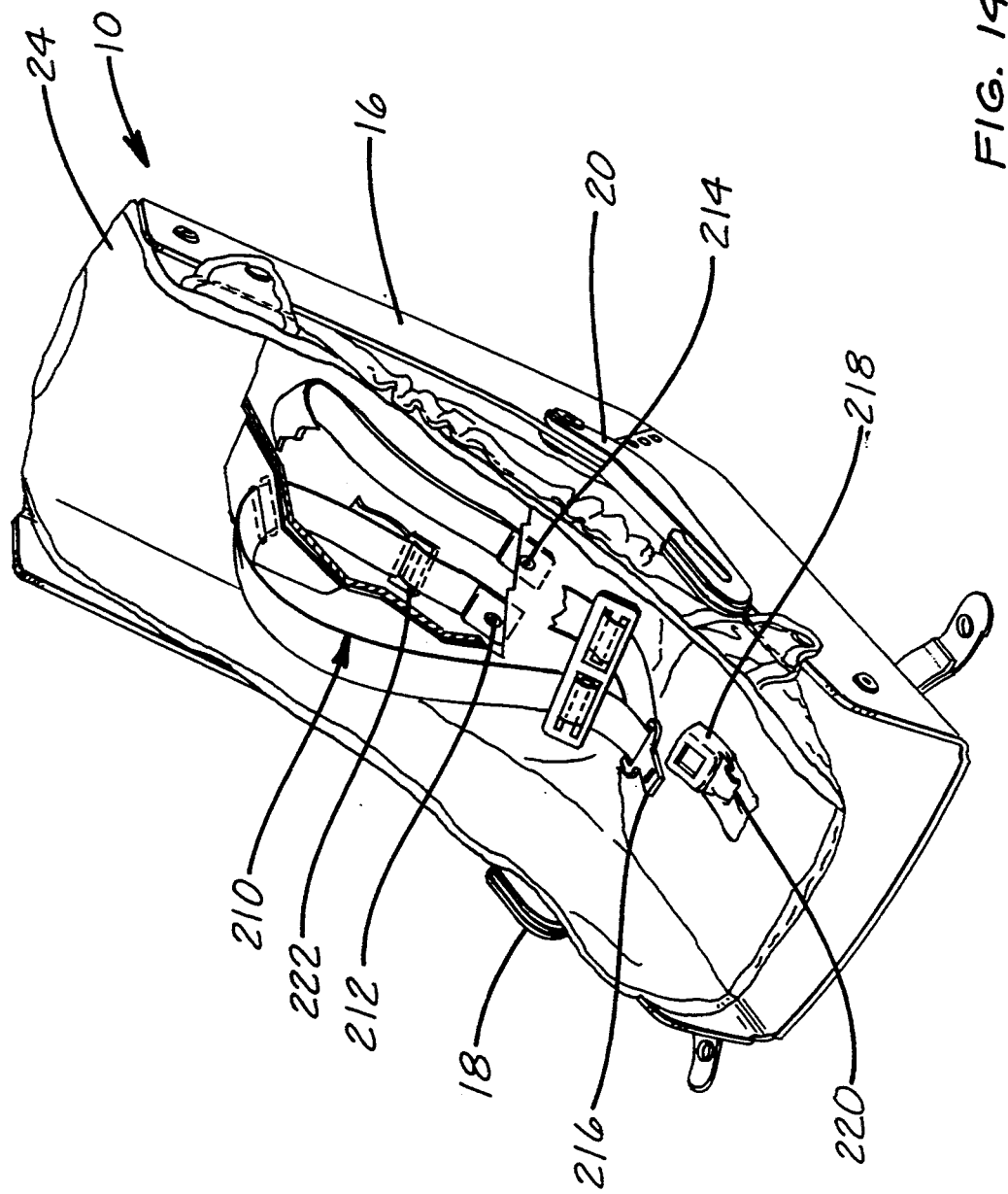
FIG. 14 illustrates an alternative strap arrangement usable in a seat of the type shown in FIG. 1.

FIG. 14 illustrates an alternative configuration for the shoulder strap and buckle assembly 26 and leg strap and buckle assembly 28. The arrangement is generally similar to that illustrated in FIG. 1, with several exceptions. The shoulder strap and buckle assembly 210 is secured to the frame at two points 212 and 214, rather than one, and includes a single male buckle element 216 that engages the female buckle element 218 of the leg strap and buckle assembly 220. One advantage of this configuration is that the assembly 210 can be adjusted via a single adjustment buckle 222. As will be appreciated, some modifications to the frame are required to accommodate this alternative configuration.

The infant seat 10 described above, has a number of advantages over conventional seats. In that regard, the seat 10 provides the desired protection for the infant even under relatively extreme circumstances. Because it is collapsible, the seat is also conveniently stored and carried when not in use. In addition, the single sheet frame makes the seat relatively inexpensive and simple to manufacture. Further, the seat is freestanding, easy to use, and adaptable for use with a variety of different types of vehicles.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A seat for use with a seat belt in a vehicle to restrain an infant, said seat comprising:
   a frame having first and second edges, said frame being collapsible to a folded position and extendible to an open position about a first hinge, said first hinge being located between said first and second edges; and
   an arm including a slot, movable between a first position and a second position, said slot slidably engaging said first and second edges across said first hinge when said arm is in said first position, inhibiting said frame from collapsing to the folded position.

2. The seat of claim 1, wherein said arm does not extend across said first hinge when in said second position.

3. The seat of claim 1, further comprising at least one strap for securing said frame in said folded position.

4. The seat of claim 1, wherein said arm is further for absorbing loads applied to said seat.

5. A seat for use with a seat belt in a vehicle to restrain an infant, said seat comprising:
   a frame that is collapsible to a folded position and extendible to an open position; and
   an arm, movable between a first position and a second position, said arm inhibiting said frame from collapsing to the folded position when said arm is in the first position, wherein said frame is collapsible and extendible about a first hinge and wherein said arm extends across said first hinge when in said first position and does not extend across said first hinge when in said second position said frame including an upper left section, lower left section, a left hinge that joins said upper left and lower left sections, an upper right section, lower right section, and a right hinge that joins said upper right and lower right sections, wherein said arm is a left arm that extends across said left hinge when in said first position, said seat further comprising a right arm that is movable between a first position in which said right arm extends across said right hinge and a second position in which said right arm does not extend across said right hinge.

6. The seat of claim 5, wherein said right arm includes a body and a hook, said right arm body being pivotably coupled to said upper right section of said frame and including an axially extending channel for engaging said lower right section when said right arm is in said first position, said left arm including a body and a hook, said left arm body being pivotably coupled to said upper left section of said frame and including an axially extending channel for engaging said lower left section when said left arm is in said first position, said right and left arm hooks being dimensioned to engage the seat belt.

7. The seat of claim 6, further comprising a right spring-biased latch, coupled to said hook of said right arm and axially movable between a latched position and a release position, and a left spring-biased latch, coupled to said hook of said left arm and axially movable between a latched position and a release position, said lower right section and said lower left section of said frame each being provided with a recess, said right spring-biased latch engaging said recess in said lower left section when in its latched position and said left spring-biased latch engaging said recess in said lower right section when in its latched position.

8. The seat of claim 7, wherein said frame further includes a back section, base section, upper right hinge, upper left hinge, lower right hinge, lower left hinge, and central hinge, said back section coupled to said upper right section by said upper right hinge and coupled to said upper left section by said upper left hinge, said base section coupled to said lower right section by said lower right hinge and coupled to said lower left section by said lower left hinge, said back section and said base section coupled by said central hinge.

9. The seat of claim 6, further comprising a right three-finger latch and a left three-finger latch.

10. A seat for use with a seat belt in a vehicle to restrain an infant, said seat comprising:
a frame that is collapsible to a folded position and extendible to an open position; and
an arm, movable between a first position and a second position, said arm inhibiting said frame from collapsing to the folded position when said arm is in the first position wherein said frame includes a base section and back section, joined along a hinge, said seat further comprising a support that is slidably attached to said base section for movement between an extended position and a retracted position, said support projecting beyond said base section in a plane generally parallel to said base section when in said extended position.

11. A seat for use with a seat belt in a vehicle to restrain an infant in the event the vehicle undergoes a sudden change in velocity, said seat comprising:
a frame, formed from a sheet of material that includes a back section, a base section, an upper right section, a lower right section, an upper left section, a lower left section, a back/base hinge formed between said back section and said base section, an upper right/back hinge formed between said back section and said upper right section, an upper left/back hinge formed between said back section and said upper left section, a lower right/base hinge between said base section and said lower right section, a lower left/base hinge formed between said base section and said lower left section, a right side hinge formed in one of the upper and lower right sections, and a left side hinge formed in one of the upper and lower left sections; and
at least one attachment element that joins the upper right and lower right sections and the upper left and lower left sections.

12. The seat of claim 11, wherein said sheet of flexible material has a generally uniform thickness that is reduced to roughly 20 percent at each of said hinges.

13. The seat of claim 11, further comprising a right arm and a left arm, said right arm including a body having a first end pivotably coupled to said upper right section of said frame and a second end including a hook, said left arm including a body having a first end pivotably coupled to said upper left section of said frame and a second end including a hook.

14. The seat of claim 13, wherein said right and left arms are movable between open and folded positions, and wherein said right arm body includes a slot designed to engage said lower right section of said frame when said right arm is in said open position, and wherein said left arm body includes a slot designed to engage said lower left section of said frame when said left arm is in said open position.

15. The seat of claim 13, wherein said lower right section of said frame includes a recess, said right arm hook includes a right latch for engaging said recess in said lower right section of said frame when said right arm is in said open position, said lower left section of said frame includes a recess, said left arm hook includes a left latch for engaging said recess in said lower left section of said frame when said left arm is in said open position.

16. The seat of claim 11, wherein said seat can be opened to an open position and closed to a closed position, said upper right section and said lower right section being substantially parallel when said seat is in said closed position, said upper left section and said lower left section being substantially parallel when said seat is in said closed position, said upper left section and said upper right section being substantially parallel to said back section and to each other when said seat is in said closed position, said lower left section and said lower right section being substantially parallel to said base section and to each other when said seat is in said closed position, said base section being at an obtuse angle relative to said back section when said seat is in said open position, said upper left sections and said upper right section being at obtuse angles relative to said back section when said seat is in said open position, and said lower left section and said lower right section being at obtuse angles relative to said base section when said seat is in said open position.

17. The seat of claim 11, wherein said attachment element is a plurality of rivets.

18. The seat of claim 11, wherein said attachment element is an ultrasonically welded region joining the upper right and lower right sections and the upper left and lower left section.

19. The seat of claim 11, further comprising a support pad that is removably attachable to said frame and a restraint strap assembly coupled to said frame.

20. A seat, for use with a seat belt in a vehicle to restrain an infant in the event the vehicle undergoes a sudden change in velocity, said seat comprising:
foldable frame means for opening to an open position to receive, support, and restrain the infant in the event the vehicle undergoes a sudden change in velocity and for closing to a closed position to allow said seat to be more easily stored when not in use;

securement means, coupleable to said frame means, for securing the infant relative to said frame means, and an arm coupled to said foldable frame means including a seat for receiving said seat belt and coupling said foldable frame means to said seat belt.

21. The seat of claim 20, wherein said seat is for rearward-facing use and further comprises locking means for locking said foldable frame means in said open position.

22. A seat, for use with a seat belt in a vehicle to restrain an infant in the event the vehicle undergoes a sudden change in velocity, said seat comprising:

foldable frame means for opening to an open position to receive, support, and restrain the infant in the event the vehicle undergoes a sudden change in velocity and for closing to a closed position to allow said seat to be more easily stored when not in use; and securement means, coupleable to said frame means, for securing the infant relative to said frame means, said seat being for rearward-facing use and further comprises locking means for locking said foldable frame means in said open position, wherein said locking means comprises a pair of locking arms, each arm including a pivot end pivotably coupled to said foldable frame means and a free end, said free end including means for coupling said arm to the seat belt and means for securely engaging said foldable frame means.

23. A method of restraining an infant, comprising the steps of:

opening a folded infant restraint seat including a back, base, upper right side, lower right side, upper left side, and lower left side and including at least one hinge between the back and base, the back and upper right side, the back and upper left side, the base and lower right side, the base and lower left side, the upper and lower right side, and the upper and lower left side;

rotating a left side arm that is pivotably coupled to the upper left side to a locked position in which a portion of the lower left side is received within a slot included in the left side arm;

rotating a right side arm that is pivotably coupled to the upper right side to a locked position in which a portion of the lower right side is received within a slot included in the right side arm;

locking the left side arm in place relative to the upper and lower left side by engaging a locking pin included in the left side arm with a recess provided in the lower left side;

locking the right side arm in place relative to the upper and lower right side by engaging a locking pin included in the right side arm with a recess provided in the lower right side;

placing an infant to be restrained in the opened seat;

securing the infant in the seat by way of a releasable shoulder harness assembly; and passing the vehicle seat belt through hooks included on the right and left side arms adjacent the locking pins.

* * * * *

UNITED STATES PATENT AND TRADEMARK OFFICE
CERTIFICATE OF CORRECTION

PATENT NO. : 5,366,271
DATED : November 22, 1994
INVENTOR(S) : G. Johnston et al.

It is certified that error appears in the above-indentified patent and that said Letters Patent is hereby corrected as shown below:

| COLUMN | LINE | |
|---|---|---|
| [56]<br>Pg. 1, col. 2 | Refs. Cited<br>(U.S. Pats.,<br>Item 12) | "Mederiros" should read --Medeiros-- |
| 7 | 26 | After "lower" insert --left-- |
| 8 | 23 | "hook 2139" should read --hook 139-- |
| 9 | 46 | After "base" insert --46. -- |
| 11 | 11 | "lea" should read --left-- |
| 11 | 50 | Before "detent" insert --a-- |
| 14<br>(Claim 16, | 45<br>line 15) | "left sections" should read --left section-- |

Signed and Sealed this

Second Day of May, 1995

Attest:

BRUCE LEHMAN

Attesting Officer

Commissioner of Patents and Trademarks